(12) United States Patent
Wang et al.

(10) Patent No.: US 11,653,407 B2
(45) Date of Patent: May 16, 2023

(54) INFORMATION TRANSMISSION METHOD AND APPARATUS, AND TERMINAL AND NETWORK DEVICE

(71) Applicant: GUANGDONG OPPO MOBILE TELECOMMUNICATIONS CORP., LTD., Dongguan (CN)

(72) Inventors: Shukun Wang, Dongguan (CN); Jianhua Liu, Dongguan (CN); Ning Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 327 days.

(21) Appl. No.: 17/171,884

(22) Filed: Feb. 9, 2021

(65) Prior Publication Data

US 2021/0168896 A1 Jun. 3, 2021

Related U.S. Application Data

(63) Continuation of application No. PCT/CN2018/108223, filed on Sep. 28, 2018.

(51) Int. Cl.
*H04W 24/10* (2009.01)
*H04W 76/27* (2018.01)
*H04W 76/15* (2018.01)

(52) U.S. Cl.
CPC ........... *H04W 76/27* (2018.02); *H04W 24/10* (2013.01); *H04W 76/15* (2018.02)

(58) Field of Classification Search
CPC ..... H04W 76/27; H04W 24/10; H04W 76/15; H04W 72/56; H04W 72/20
See application file for complete search history.

(56) References Cited

U.S. PATENT DOCUMENTS

2021/0022146 A1* 1/2021 Hong ................. H04W 72/51
2021/0250757 A1* 8/2021 Wang ................. H04W 76/20

FOREIGN PATENT DOCUMENTS

CN 102892081 A 1/2013
CN 105992393 A 10/2016
(Continued)

OTHER PUBLICATIONS

Extended European Search Report issued in corresponding European Application No. 18934826.1, dated Jul. 15, 2021, 11 pages.
(Continued)

*Primary Examiner* — Chuong A Ngo
(74) *Attorney, Agent, or Firm* — Bayes PLLC (57) ABSTRACT

Provided are an information transmission method and apparatus, and a terminal, and a network device. The method includes a terminal sending a first Radio Resource Control (RRC) message to a first node and receiving a second RRC message sent by the first node. The second RRC message carries configuration information of a second node. The method also includes the terminal determining, according to a locally stored measurement result, whether the second node meets a target requirement. The method further includes if the second node does not meet the target requirement, the terminal carrying first indication information in a third RRC message sent to the first node. The first indication information is used for indicating that the second node is not accepted by the terminal.

19 Claims, 4 Drawing Sheets

---

A terminal sends a first RRC message to a first node, and receives a second RRC message sent by the first node, wherein the second RRC message carries configuration information of a second node — 301

The terminal determines, according to a locally stored measurement result, whether the second node meets a target requirement, and if the second node does not meet the target requirement, the terminal carries first indication information in a third RRC message sent to the first node, wherein the first indication information is used for indicating that the second node is not accepted by the terminal — 302

(56) References Cited

FOREIGN PATENT DOCUMENTS

| CN | 107548166 A | 1/2018 |
|---|---|---|
| WO | 2018056623 A1 | 3/2018 |
| WO | 2018171583 A1 | 9/2018 |
| WO | 2020061995 A1 | 4/2020 |

OTHER PUBLICATIONS

"Suspension of UE to RRC_Inactive in MR dual connectivity", Agenda item: 10.2.14, Source: Samsung,3GPP TSG-RAN WG2 2018 RAN2 Ad-hoc Meeting, R2-1801417, Vancouver, Canada, Jan. 21-25, 2018, 4 pages.

"RRC—Inactive with MR—DC", Agenda item: 10.6, Source: Qualcomm Incorporated, 3GPP TSG-RAN WG3 Meeting NR Ad-Hoc 2, R3-172430, Qingdao, China, Jun. 27-29, 2017, 6 pages.

First Office Action issued in corresponding Chinese Application No. 202110040737.6, dated Jun. 2, 2022, 21 pages.

PCT Written Opinion of The International Searching Authority issued in corresponding International Application No. PCT/CN2018/108223, dated Jul. 3, 2019, 7 pages.

"3rd Generation Partnership Project; Technical Specification Group Radio Access Network; NR; Radio Resource Control (RRC) protocol specification (Release 16)", 3GPP TS 38.331 V16.1.0 (Jul. 2020).

\* cited by examiner

INFORMATION TRANSMISSION METHOD AND APPARATUS, AND TERMINAL AND NETWORK DEVICE

CROSS-REFERENCE TO RELATED APPLICATION

This application is a continuation of International Application No. PCT/CN2018/108223, filed Sep. 28, 2018, the entire contents of which are incorporated herein by reference.

BACKGROUND

The embodiments of the present disclosure relate to the field of mobile communication technology, and more specifically, to an information transmission method and apparatus, a terminal, and a network device.

In order to satisfy people's pursuits of rate, delay, high-speed mobility, and energy efficiency of service, as well as diversity and complexity of the service in the future life, the 3rd Generation Partnership Project (3GPP) International Standards Organization began to develop the $5^{th}$ Generation (5G) mobile communication technology.

In order to support a higher service rate demand, the network side supports Dual Connectivity (DC), or Multi Connectivity (MC). However, for terminals that support the DC/MC mode, how to configure a Secondary Node (SN) in a Radio Resource Control (RRC) connection establishment procedure or an RRC connection resume procedure to make the configuration of SN fast and effective is a problem that needs to be considered.

SUMMARY

The embodiments of the present disclosure provide an information transmission method and apparatus, a terminal, and a network device.

The information transmission method provided by an embodiment of the present disclosure includes sending, by a terminal, a first radio resource control (RRC) message to a first node, and receiving, by the terminal, a second RRC message sent by the first node, wherein the second RRC message carries configuration information of a second node; and determining, by the terminal, whether the second node meets a target requirement according to a locally stored measurement result, and when the second node does not meet the target requirement, carrying, by the terminal, first indication information in a third RRC message sent to the first node, wherein the first indication information is used to indicate that the second node is not accepted by the terminal.

The information transmission method provided by an embodiment of the present disclosure includes receiving, by a first node, a first RRC message sent by a terminal, and sending, by the first node, a second RRC message to the terminal, wherein the second RRC message carries configuration information of a second node; receiving, by the first node, a third RRC message sent by the terminal, and determining, by the first node, whether the third RRC message carries first indication information, wherein the first indication information is used to indicate that the second node is not accepted by the terminal; and releasing, by the first node, the configuration information of the second node when the third RRC message carries the first indication information.

An information transmission apparatus provided by an embodiment of the present disclosure is applied to a terminal, and the apparatus includes a first sending unit configured to send a first RRC message to a first node; a receiving unit, configured to receive a second RRC message sent by the first node, wherein the second RRC message carries configuration information of a second node; a determining unit configured to determine whether the second node meets a target requirement according to a locally stored measurement result; and a second sending unit, configured to, when the second node does not meet the target requirement, carry first indication information in a third RRC message sent to the first node, wherein the first indication information is used to indicate that the second node is not accepted by the terminal.

An information transmission apparatus provided by an embodiment of the present disclosure is applied to a first node, and the apparatus includes a first receiving unit configured to receive a first RRC message sent by a terminal; a first sending unit configured to send a second RRC message to the terminal, wherein the second RRC message carries configuration information of a second node; a second receiving unit configured to receive a third RRC message sent by the terminal, and determine whether the third RRC message carries first indication information, wherein the first indication information is used to indicate that the second node is not accepted by the terminal; and a releasing unit configured to release the configuration information of the second node when the third RRC message carries the first indication information.

A terminal provided by an embodiment of the present disclosure includes a processor and a memory. The memory is configured to store a computer program, and the processor is configured to call and run the computer program stored in the memory, and execute the information transmission method above.

A network device provided by an embodiment of the present disclosure includes a processor and a memory. The memory is configured to store a computer program, and the processor is configured to call and run the computer program stored in the memory and execute the information transmission method above.

A chip provided by an embodiment of the present disclosure is configured to implement the information transmission method above.

Specifically, the chip includes a processor configured to call and run a computer program from a memory, so that a device installed with the chip executes the information transmission method above.

A computer-readable storage medium provided by an embodiment of the present disclosure is configured to store a computer program, where the computer program enables a computer to execute the information transmission method above.

A computer program product provided by an embodiment of the present disclosure includes a computer program instruction, where the computer program instruction enables a computer to execute the information transmission method above.

A computer program is provided by an embodiment of the present disclosure, where the computer program enables a computer to execute the information transmission method above when running on the computer.

Through the above technical solutions, it is determined whether the SN blindly configured on the network side meets the target requirement (i.e., whether it can be used) by a terminal feedback method, so that a blind configuration of the SN is fast and effective.

BRIEF DESCRIPTION OF THE DRAWINGS

The drawings described here are used to provide a further understanding of the present disclosure and constitute a part of the present disclosure, and the exemplary embodiments of the present disclosure and the description thereof are used to explain the present disclosure and do not constitute an improper limitation of the present disclosure. In the drawings.

DETAILED DESCRIPTION

The technical solutions in the embodiments of the present disclosure will be described below in combination with the drawings in the embodiments of the present disclosure. Obviously, the described embodiments are part of the embodiments of the present disclosure, rather than all of them. Based on the embodiments of the present disclosure, all other embodiments obtained by those of ordinary skill in the art without creative work fall within the protection scope of the present disclosure.

The technical solutions of the embodiments of the present disclosure can be applied to various communication systems, such as a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) System, LTE Time Division Duplex (TDD), a Universal Mobile Telecommunication System (UMTS), a Worldwide Interoperability for Microwave Access (WiMAX) communication system or a 5G system, etc.

Figure 1:
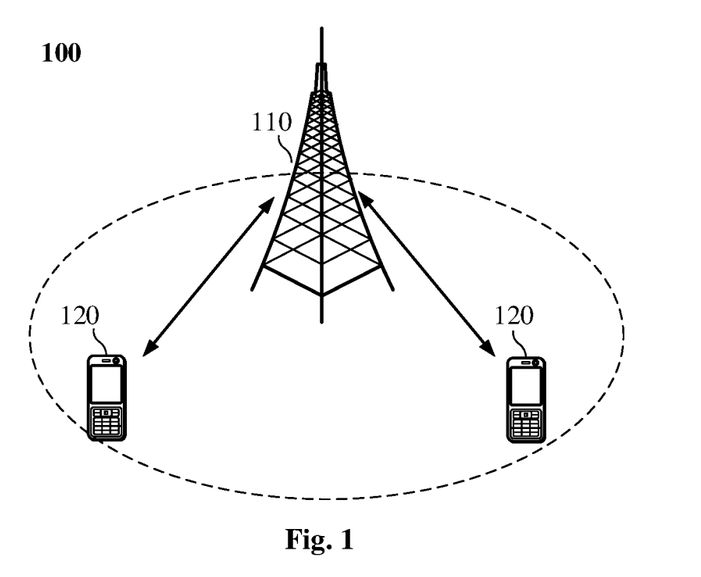
FIG. 1 is a schematic diagram of a communication system architecture provided by an embodiment of the present disclosure.

Exemplarily, a communication system 100 applied in an embodiment of the present disclosure is shown in FIG. 1. The communication system 100 may include a network device 110, and the network device 110 may be a device that communicates with a terminal 120 (or called a communication terminal or a terminal). The network device 110 may provide communication coverage for a specific geographic area and may communicate with the terminal located in the coverage area. Alternatively, the network device 110 may be a Base Transceiver Station (BTS) in the GSM system or the CDMA system, or a NodeB (NB) in the WCDMA system, or an Evolutional Node B (eNB or eNodeB) in the LTE system, or a wireless controller in Cloud Radio Access Network (CRAN), or the network device may be a mobile switching center, a relay station, an access point, a vehicle-mounted device, a wearable device, a hub, a switch, a bridge, a router, a network side device in 5G network, or a network device in future evolving Public Land Mobile Network (PLMN), etc.

The communication system 100 also includes at least one terminal 120 located within the coverage area of the network device 110. The "Terminal" as used herein includes, but is not limited to, a connection via a wired line, such as a connection via Public Switched Telephone Networks (PSTN), a Digital Subscriber Line (DSL), a digital cable, and a direct cable; and/or another data connection/network; and/or via a wireless interface, such as cellular network, Wireless Local Area Network (WLAN), digital television network such as DVB-H network, satellite network and an AM-FM broadcast transmitter; and/or an apparatus of another terminal set to receive/send communication signals; and/or an Internet of things (TOT) device. The terminal set to communicate through the wireless interface may be referred to as "a wireless communication terminal," "a wireless terminal," or "a mobile terminal." Examples of the mobile terminal include, but is not limited to, a satellite or cellular phone; a Personal Communications System (PCS) terminal that may combine a cellular radiophone with data processing, fax, and data communication capabilities; a PDA that may include a radiophone, a pager, an Internet/Intranet access, a web browser, a note, a calendar, and/or a Global Positioning System (GPS) receiver; and a conventional laptop and/or palmtop receiver or other electronic devices including a radiophone transceiver. The terminal may refer to an access terminal, User Equipment (UE), a subscriber unit, a subscriber station, a mobile station, a mobile platform, a remote station, a remote terminal, a mobile device, a user terminal, a terminal, a wireless communication device, a user agent or a user apparatus. The access terminal may be the cellular phone, a cordless telephone, a Session Initiation Protocol (SIP) phone, a Wireless Local Loop (WLL) station, the Personal Digital Assistant (PDA), a handheld device, a computing device having wireless connection functions or other processing device connected to a wireless modem, a vehicle-mounted device, a wearable device, a terminal in the 5G network or a terminal in the future evolving PLMN, etc.

Alternatively, Device to Device (D2D) communication may be performed between the terminals 120.

Alternatively, the 5G system or the 5G network may also be referred to as a New Radio (NR) system or NR network.

FIG. 1 illustrates schematically one network device and two terminals. Alternatively, the communication system 100 may include a plurality of network devices, and other number of terminals may be included within the coverage of each network device, which are not limited in the embodiments of the present disclosure.

Alternatively, the communication system 100 may also include a network controller, a mobile management entity, and other network entities, which are not limited in the embodiments of the present disclosure.

It should be understood that a device with communication functions in the network/system in the embodiments of the present disclosure may be referred to as a communication device. Taking the communication system 100 shown in FIG. 1 as an example, the communication device may include the network device 110 and the terminal 120 with communication functions, and the network device 110 and the terminal 120 may be specific devices described above, which will not be repeated here; and the communication device may also include other devices in the communication system 100, such as the network controller, the mobile management entity and other network entities, which are not limited in the embodiments of the present disclosure.

It should be understood that the terms "system" and "network" herein are often used interchangeably herein. The term "and/or" herein is only used to describe an association relationship between associated objects, which represents that there may be three kinds of relationships. For example, A and/or B may represent three situations: A exists alone, A and B exist at the same time, and B exists alone. In addition, the character "/" herein generally represents that pre and post associated objects are in an "or" relationship.

The technical solutions of the embodiments of the present disclosure are mainly applied to a 5G mobile communication system. The technical solutions of the embodiments of the present disclosure are not limited to the 5G mobile communication system, but can also be applied to other types of mobile communication systems. The main application scenarios of the 5G mobile communication technology are Enhance Mobile Broadband (eMBB), Ultra Reliable Low Latency Communication (URLLC), and massive Machine Type Communication (mMTC). The main application scenarios in the 5G mobile communication system will be described below:

1) eMBB scenario: the eMBB aims at obtaining multimedia content, service, and data for the user, and its service demand is growing very rapidly. Since the eMBB may be deployed in different scenarios, such as interior, an urban area, and a rural area, etc., its service capability and demand are quite different, and therefore it is necessary to analyze the service in combination with specific deployment scenarios.

2) URLLC scenario: typical applications of the URLLC include industrial automation, power automation, telemedicine operation, and traffic safety guarantee, etc.

3) mMTC scenario: typical features of the URLLC include high connection density, small data volume, low cost and long service life of a delay insensitive service and module, etc.

In the 5G network environment, in order to reduce air interface signaling, quickly resume (recovery) a wireless connection, and quickly resume a data service, a new RRC state is defined, that is, a RRC INACTIVE state. This state is different from a RRC IDLE state and a RRC_CONNECTED state.

Three RRC states in the 5G network environment will be described below:

1) the RRC IDLE state: mobility is UE-based cell selection reselection, paging is triggered by CN, and a paging area is configured by the CN. There is no UE AS context on base station-side. There is no RRC connection.

2) the RRC_CONNECTED state: there is the RRC connection, and a base station and the UE have the UE AS context. The network side knows that a location of the UE is of a specific cell level. The mobility is mobility controlled by the network side. Unicast data can be transmitted between the UE and the base station.

3) the RRC INACTIVE state: the mobility is the UE-based cell selection reselection, there is a connection between the CN and RAN, the UE AS context exists on a certain base station, the paging is triggered by the RAN, the paging area based on the RAN is managed by the RAN, and the network side knows that the location of the UE is based on a paging area level of the RAN.

When the User Equipment (UE) is in the RRC INACTIVE state, the network side may configure the paging area of the Radio Access Network (RAN) for the UE through dedicated signaling, and the paging area of the RAN may be one or more cells. When the UE moves in the area, it does not need to notify the network side, and it follows mobility behavior under idle condition, that is, a cell selection reselection principle. When the UE moves out of the paging area configured by the RAN, it may trigger the UE to recover the RRC connection and re-obtain the paging area configured by the RAN. When the UE has downlink data arriving, the base station (such as gNB) that keeps the connection between the RAN and the Core Network (CN) for the UE may trigger all cells in the paging area of the RAN to send paging messages to the UE, so that the UE in the INACTIVCE state can recover the RRC connection and receive data.

Therefore, there are the following three situations for the UE to enter the RRC_CONNECTED state from the INACTIVE state.

In the first situation, when the UE has the downlink data arriving, the network side initiates the paging on RAN side to impel the UE to enter the connection state.

In the second situation, the UE itself initiates RAN location area update, such as periodic RAN location update or cross-area location update.

In the third situation, the UE has a demand for uplink data transmission, which impels the UE to enter the connection state.

Figure 2:
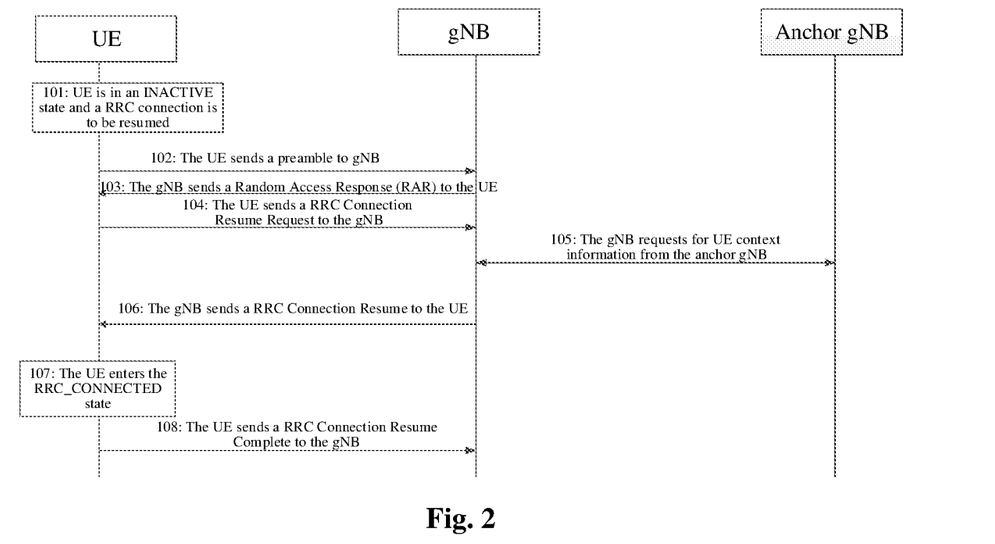
FIG. 2 is a schematic diagram of an RRC connection resume procedure.

FIG. 2 is a schematic diagram of an RRC connection resume procedure. As shown in FIG. 2, the RRC connection resume procedure includes the following processes.

In step 101: the UE is in the INACTIVE state and needs to recover the RRC connection.

In step 102: the UE sends a preamble to the gNB.

In step 103: the gNB sends a Random Access Response (RAR) to the UE.

In step 104: the UE sends an RRC resume request message (RRC Connection Resume Request) to the gNB.

In step 105: the gNB asks for UE context information from an anchor gNB.

In step 106: the gNB sends an RRC connection resume message (RRC Connection Resume) to the UE.

In step 107: the UE enters the RRC_CONNECTED state.

In step 108: the UE sends an RRC connection resume complete message (RRC Connection Resume Complete) to the gNB.

Figure 3:
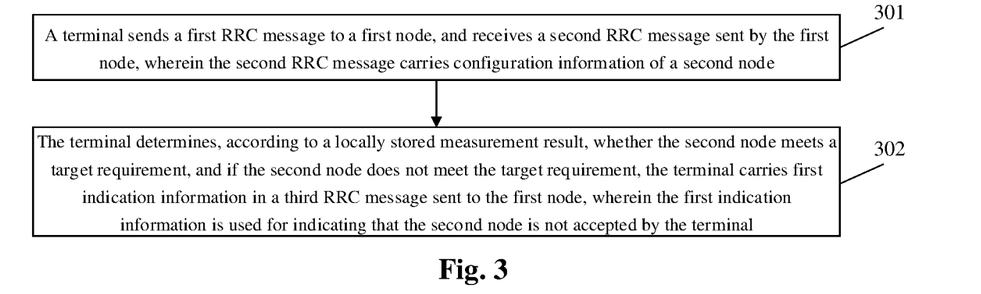
FIG. 3 is a first schematic flowchart of an information transmission method provided by an embodiment of the present disclosure.

FIG. 3 is a first schematic flowchart of an information transmission method provided by an embodiment of the present disclosure. As shown in FIG. 3, the information transmission method includes the following steps.

In step 301: a terminal sends a first RRC message to a first node and receives a second RRC message sent by the first node, where the second RRC message carries configuration information of a second node.

In the embodiment of the present disclosure, the terminal may be any device that can communicate with the network, such as a mobile phone, a tablet computer, a vehicle-mounted terminal, and a notebook.

In the embodiment of the present disclosure, the terminal is a terminal configured with a DC mode or an MC mode, the first node is a target master node, and the second node is an original secondary node stored on the first node side or a new secondary node re-determined by the first node.

In the embodiment of the present disclosure, the configuration information of the second node includes bearer configuration information and physical layer resource configuration information.

In an RRC connection resume procedure, the first RRC message is an RRC connection resume request message, the second RRC message is an RRC connection resume response message, and the third RRC message involved in the following step 302 is an RRC connection resume complete message.

In an RRC connection establishment procedure, the first RRC message is an RRC reconfiguration request message, the second RRC message is an RRC reconfiguration response message, and the third RRC message involved in the following step 302 is an RRC reconfiguration complete message.

For example, the UE configured with the DC mode sends the RRC connection resume request message to a target MN in the INACTIVE state, and then the target MN configures the UE with SN and SN configuration information. Here, the SN configuration information includes bearer configuration information and physical layer resource configuration information on the SN side. The SN configured by the target MN for the UE may be an original SN stored on the target MN side in the INACTIVE state, or it may be an SN blindly configured by the target MN. Then, the target MN sends the SN configuration information to the UE in the RRC connection resume response message.

For another example, the UE configured with the DC mode sends the RRC reconfiguration request message to the target MN in the INACTIVE state, and then the target MN configures the UE with the SN and the SN configuration information. Here, the SN configuration information includes the bearer configuration information and the physical layer resource configuration information on the SN side. The SN configured by the target MN for the UE may be the original SN stored on the target MN side in the INACTIVE state, or it may be the SN blindly configured by the target MN. Then, the target MN sends the SN configuration information to the UE in the RRC reconfiguration response message.

It should be understood that the above-mentioned first RRC message is MSG3, and the second RRC message is MSG4.

Alternatively, the second RRC message further carries a first measurement threshold.

In step 302: the terminal determines whether the second node meets a target requirement according to a locally stored measurement result, and when the second node does not meet the target requirement, the terminal carries first indication information in a third RRC message sent to the first node, where the first indication information is used to indicate that the second node is not accepted by the terminal.

In the embodiment of the present disclosure, 1) if the second RRC message does not carry the first measurement threshold, the terminal determines whether the second node meets the target requirement according to the locally stored measurement result. 2) If the second RRC message carries the first measurement threshold, the terminal determines whether the second node meets the target requirement according to the locally stored measurement result and the first measurement threshold. Further, if the measurement result of the second node is greater than or equal to the first measurement threshold, it is determined that the second node meets the target requirement; and if the measurement result of the second node is less than the first measurement threshold, it is determined that the second node does not meet the target requirement.

For the above 1), if there is no first measurement threshold in the MSG4, the UE obtains the configuration information of the SN (including PSCell configuration information) after receiving the MSG4, and the UE determines whether the SN is good enough (i.e., whether it meets the target requirement) according to the locally stored measurement result. Here, how the UE determines whether the SN meets the target requirement depends on the realization of the UE. For example, the UE determines whether the SN meets the target requirement according to the quality of the SN.

For the above 2), if there is the first measurement threshold in the MSG 4, the UE obtains the configuration information of the SN (including the PSCell configuration information) after receiving the MSG4, and the UE determines whether the SN is good enough (that is, whether it meets the target requirement) according to the locally stored measurement result and the first measurement threshold. For example, if the measurement result of the PSCell is greater than or equal to the first measurement threshold, the SN meets the target requirement, and if the measurement result of the PSCell is less than the first measurement threshold, the SN does not meet the target requirement.

In the above solution, if the SN meets the target requirement, the UE considers that the SN can be used; and if the SN does not meet the target requirement, the UE considers that the SN cannot be used, and a new SN needs to be configured by the target MN.

In the above solution, if the UE determines that the SN configured by the target MN does not meet the target requirement, it sends an indication to the network side in the third RRC message (i.e., MSG5) to indicate that the SN is not accepted by the UE. In the RRC connection resume procedure, the third RRC message is the RRC connection resume complete message, and in the RRC connection establishment procedure, the third RRC message is the RRC reconfiguration complete message.

In the embodiment of the present disclosure, if the second node does not meet the target requirement, the terminal releases the second node and the configuration information of the second node, and correspondingly, the first indication information is also used to indicate the terminal to release the configuration information of the second node. For example, if the SN configured by the target MN does not meet the target requirement, the UE releases the SN and releases the bearer configuration information and the physical layer resource configuration information on the SN side. Further, after receiving the MSG 5, the target MN releases the SN if the above indication is included in the MSG 5. According to the situation, the target MN decides whether to initiate the RRC connection reconfiguration message to configure a new SN and configuration information (including bearer configuration information and physical layer resource configuration information) on the SN side. For example, if a bearer on the SN side has no service demand, the target MN can release the bearer on the SN side directly; and if the bearer on the SN side has the service demand, the target MN may configure a new SN and SN configuration information, or the target MN may configure the bearer on the SN side as a bearer on the MN side. Here, when configuring the new SN, the target MN may configure it based on a measurement report reported by the UE, so that the SN that can be configured may meet the requirement of the UE; that is, it can be used by the UE.

Figure 4:
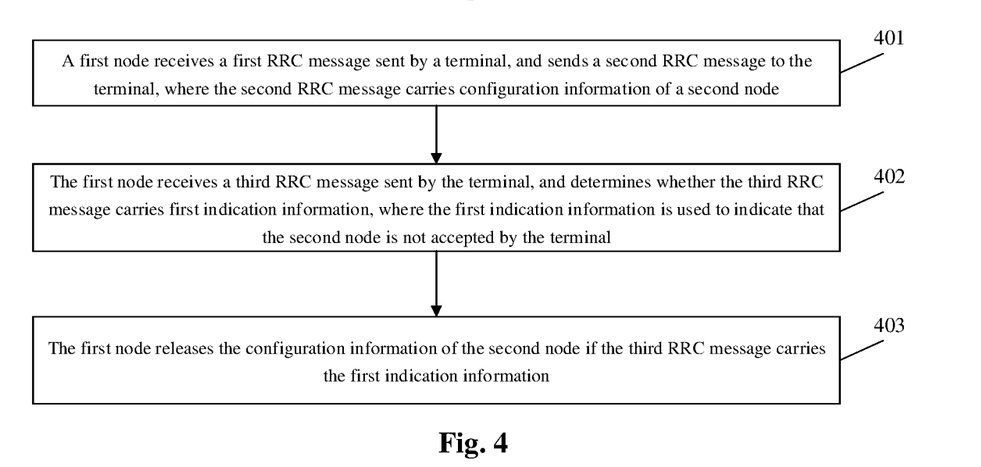
FIG. 4 is a second schematic flowchart of an information transmission method provided by an embodiment of the present disclosure.

FIG. 4 is a second schematic flowchart of an information transmission method provided by an embodiment of the present disclosure. As shown in FIG. 4, the information transmission method includes the following steps.

In step 401: a first node receives a first RRC message sent by a terminal and sends a second RRC message to the terminal, where the second RRC message carries configuration information of a second node.

In the embodiment of the present disclosure, the terminal may be any device that can communicate with the network, such as a mobile phone, a tablet computer, a vehicle-mounted terminal, and a notebook.

In the embodiment of the present disclosure, the terminal is a terminal configured with a DC mode or an MC mode, the first node is a target master node, and the second node is an original secondary node stored on the first node side or a new secondary node re-determined by the first node.

In the embodiment of the present disclosure, the configuration information of the second node includes bearer configuration information and physical layer resource configuration information.

In an RRC connection resume procedure, the first RRC message is an RRC connection resume request message, the second RRC message is an RRC connection resume response message, and the third RRC message involved in the following step 302 is an RRC connection resume complete message.

In an RRC connection establishment procedure, the first RRC message is an RRC reconfiguration request message, the second RRC message is an RRC reconfiguration response message, and the third RRC message involved in the following step 302 is an RRC reconfiguration complete message.

For example, the UE configured with the DC mode sends the RRC connection resume request message to a target MN in the INACTIVE state, and then the target MN configures the UE with an SN and SN configuration information. Here, the SN configuration information includes bearer configuration information and physical layer resource configuration information on SN side. The SN configured by the target MN for the UE may be an original SN stored on the target MN side in the INACTIVE state or may be an SN blindly configured by the target MN. Then, the target MN sends the SN configuration information to the UE in the RRC connection resume response message.

For another example, the UE configured with the DC mode sends the RRC reconfiguration request message to the target MN in the INACTIVE state, and then the target MN configures the UE with the SN and the SN configuration information. Here, the SN configuration information includes the bearer configuration information and the physical layer resource configuration information on the SN side. The SN configured by the target MN for the UE may be the original SN stored on the target MN side in the INACTIVE state or may be the SN blindly configured by the target MN. Then, the target MN sends the SN configuration information to the UE in the RRC reconfiguration response message.

It should be understood that the above-mentioned first RRC message is MSG3, and the second RRC message is MSG4.

Alternatively, the second RRC message further carries a first measurement threshold.

Alternatively, the second RRC message further carries a first measurement threshold; and the first measurement threshold is used by the terminal to determine whether the second node meets a target requirement in combination with a measurement result of the second node.

In step 402: the first node receives a third RRC message sent by the terminal and determines whether the third RRC message carries first indication information, where the first indication information is used to indicate that the second node is not accepted by the terminal.

In the embodiment of the present disclosure, the terminal determines whether the second node meets the target requirement according to a locally stored measurement result, and if the second node does not meet the target requirement, the terminal carries the first indication information in the third RRC message sent to the first node, the first indication information being used to indicate that the second node is not accepted by the terminal.

In the embodiment of the present disclosure, 1) if the second RRC message does not carry the first measurement threshold, the terminal determines whether the second node meets the target requirement according to the locally stored measurement result. 2) If the second RRC message carries the first measurement threshold, the terminal determines whether the second node meets the target requirement according to the locally stored measurement result and the first measurement threshold. Further, if the measurement result of the second node is greater than or equal to the first measurement threshold, it is determined that the second node meets the target requirement; and if the measurement result of the second node is less than the first measurement threshold, it is determined that the second node does not meet the target requirement.

For the above 1), if there is no first measurement threshold in the MSG4, the UE obtains the configuration information of the SN (including PSCell configuration information) after receiving the MSG4, and the UE determines whether the SN is good enough (i.e., whether it meets the target requirement) according to the locally stored measurement result. Here, how the UE determines whether the SN meets the target requirement depends on the realization of the UE. For example the UE determines whether the SN meets the target requirement according to the quality of the SN.

For the above 2), if there is the first measurement threshold in the MSG 4, the UE obtains the configuration information of the SN (including the PSCell configuration information) after receiving the MSG4, and the UE determines whether the SN is good enough (that is, whether it meets the target requirement) according to the locally stored measurement result and the first measurement threshold. For example, if the measurement result of the PSCell is greater than or equal to the first measurement threshold, the SN meets the target requirement, and if the measurement result of the PSCell is less than the first measurement threshold, the SN does not meet the target requirement.

In the above solution, if the SN meets the target requirement, the UE considers that the SN can be used; and if the SN does not meet the target requirement, the UE considers that the SN cannot be used, and a new SN needs to be configured by the target MN.

In the above solution, if the UE determines that the SN configured by the target MN does not meet the target requirement, it sends an indication to the network side in the third RRC message (i.e., MSG5) to indicate that the SN is not accepted by the UE. In the RRC connection resume procedure, the third RRC message is the RRC connection resume complete message, and in the RRC connection establishment procedure, the third RRC message is the RRC reconfiguration complete message.

In step 403: the first node releases the configuration information of the second node if the third RRC message carries the first indication information.

In the embodiment of the present disclosure, if the second node does not meet the target requirement, the terminal releases the second node and the configuration information of the second node, and correspondingly, the first indication information is also used to indicate the terminal to release the configuration information of the second node. For example, if the SN configured by the target MN does not meet the target requirement, the UE releases the SN and releases the bearer configuration information and the physical layer resource configuration information on the SN side.

In the embodiment of the present disclosure, if there is a service demand on the second node side, the first node carries configuration information of a third node in a fourth RRC message sent to the terminal, or the first node configures a bearer on the second node side as a bearer on the first node side. The third node is a new secondary node re-determined by the first node, and the third node is different from the second node.

For example, after receiving the MSG 5, the target MN releases the SN if the above indication is included in the MSG 5. According to the situation, the target MN decides whether to initiate the RRC connection reconfiguration message to configure a new SN and configuration information (including bearer configuration information and physical layer resource configuration information) on the SN side. For example, if a bearer on the SN side has no service demand, the target MN may release the bearer on the SN side directly; and if the bearer on the SN side has the service demand, the target MN may configure a new SN and SN configuration information, or the target MN may configure the bearer on the SN side as a bearer on the MN side. Here, when configuring the new SN, the target MN may configure it based on a measurement report reported by the UE, so that the SN that can be configured may meet the requirement of the UE; that is, it can be used by the UE.

Figure 5:
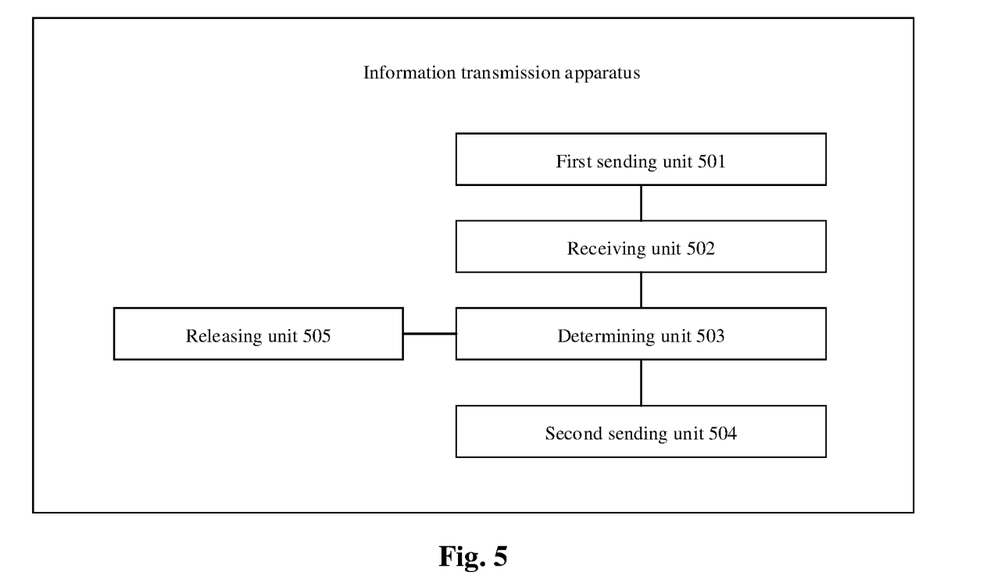
FIG. 5 is a first schematic structure composition diagram of an information transmission apparatus provided by an embodiment of the present disclosure.

FIG. 5 is a first schematic structure composition diagram of an information transmission apparatus provided by an embodiment of the present disclosure, which is applied to a terminal. As shown in FIG. 5, the apparatus includes a first sending unit 501 configured to send a first RRC message to a first node; a receiving unit 502 configured to receive a second RRC message sent by the first node, where the second RRC message carries configuration information of a second node; a determining unit 503 configured to determine whether the second node meets a target requirement according to a locally stored measurement result; and a second sending unit 504 configured to, if the second node does not meet the target requirement, carry first indication information in a third RRC message sent to the first node, where the first indication information is used to indicate that the second node is not accepted by the terminal.

In an embodiment, the second RRC message further carries a first measurement threshold.

The determining unit 503 is configured to determine whether the second node meets the target requirement according to the locally stored measurement result and the first measurement threshold.

In an embodiment, the determining unit 503 is configured to determine that the second node meets the target requirement if the measurement result of the second node is greater than or equal to the first measurement threshold; and determine that the second node does not meet the target requirement if the measurement result of the second node is less than the first measurement threshold.

In an embodiment, the apparatus further includes a releasing unit 505 configured to release the configuration information of the second node if the second node does not meet the target requirement; and correspondingly, the first indication information is further used to indicate the terminal to release the configuration information of the second node.

In an embodiment, the terminal is a terminal configured with a DC mode, the first node is a target master node, and the second node is an original secondary node stored on the first node side or a new secondary node re-determined by the first node.

In an embodiment, the first RRC message is an RRC connection resume request message, the second RRC message is an RRC connection resume response message, and the third RRC message is an RRC connection resume complete message; or, the first RRC message is an RRC reconfiguration request message, the second RRC message is an RRC reconfiguration response message, and the third RRC message is an RRC reconfiguration complete message.

Those skilled in the art should understand that the relevant description of the above-mentioned information transmission apparatus in the embodiment of the present disclosure can be understood with reference to the relevant description of the information transmission method in the embodiment of the present disclosure.

Figure 6:
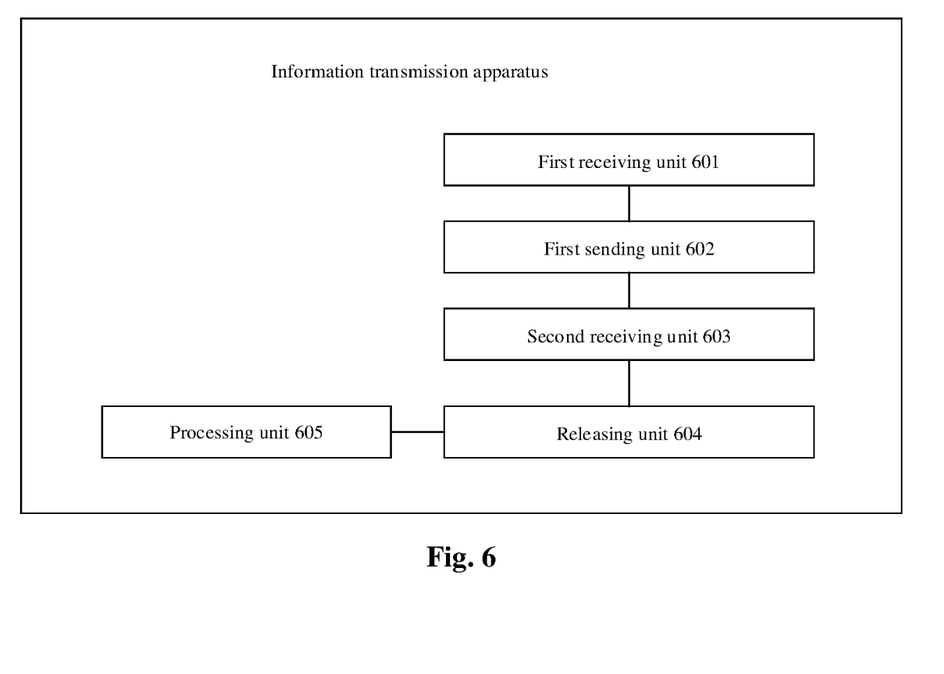
FIG. 6 is a second schematic structure composition diagram of an information transmission apparatus provided by an embodiment of the present disclosure.

FIG. 6 is a second schematic structure composition diagram of an information transmission apparatus provided by an embodiment of the present disclosure, which is applied to a first node. As shown in FIG. 6, the apparatus includes a first receiving unit 601 configured to receive a first RRC message sent by a terminal; a first sending unit 602 configured to send a second RRC message to the terminal, where the second RRC message carries configuration information of a second node; a second receiving unit 603, configured to receive a third RRC message sent by the terminal, and determine whether the third RRC message carries first indication information, where the first indication information is used to indicate that the second node is not accepted by the terminal; and a releasing unit 604, configured to release the configuration information of the second node when the third RRC message carries the first indication information.

In an embodiment, the second RRC message further carries a first measurement threshold. The first measurement threshold is used by the terminal to determine whether the second node meets a target requirement in combination with a measurement result of the second node.

In an embodiment, the first indication information is further used to indicate the terminal to release the configuration information of the second node.

In an embodiment, the apparatus further includes a processing unit 605, configured to, if there is a service demand on the second node side, carry configuration information of a third node in a fourth RRC message sent to the terminal, or configure a bearer on the second node side as a bearer on the first node side.

In an embodiment, the third node is a new secondary node re-determined by the first node, and the third node is different from the second node.

In an embodiment, the terminal is a terminal configured with a DC mode, the first node is a target master node, and the second node is an original secondary node stored on the first node side or a new secondary node re-determined by the first node.

In an embodiment, the first RRC message is an RRC connection resume request message, the second RRC message is an RRC connection resume response message, and the third RRC message is an RRC connection resume complete message; or the first RRC message is an RRC reconfiguration request message, the second RRC message is an RRC reconfiguration response message, and the third RRC message is an RRC reconfiguration complete message.

Those skilled in the art should understand that the relevant description of the above-mentioned information transmission apparatus in the embodiment of the present disclosure can be understood with reference to the relevant description of the information transmission method in the embodiment of the present disclosure.

Figure 7:
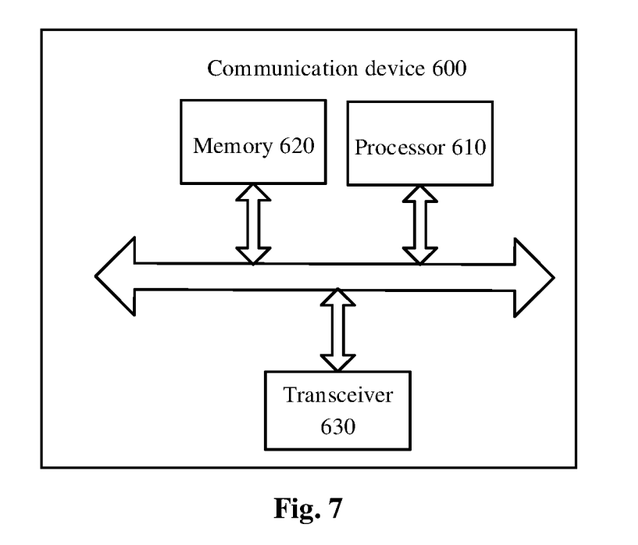
FIG. 7 is a schematic structure diagram of a communication device provided by an embodiment of the present disclosure.

FIG. 7 is a schematic structure diagram of a communication device 600 provided by an embodiment of the present disclosure. The communication device may be a terminal or a network device, the communication device 600 shown in FIG. 7 includes a processor 610, and the processor 610 may call and run a computer program from a memory to implement the method in the embodiment of the present disclosure.

Alternatively, as shown in FIG. 7, the communication device 600 may further include a memory 620. The processor 610 may call and run the computer program from the memory 620 to implement the method in the embodiment of the present disclosure.

The memory 620 may be a separate device independent of the processor 610, or it may also be integrated in the processor 610.

Alternatively, as shown in FIG. 7, the communication device 600 may further include a transceiver 630, which may be controlled by the processor 610 to communicate with other devices, and specifically, the transceiver 630 may send information or data to other devices or receive information or data sent by other devices.

The transceiver 630 may include a transmitter and a receiver. The transceiver 630 may further include an antenna, the number of which may be one or more.

Alternatively, the communication device 600 may specifically be the network device in the embodiments of the present disclosure, and the communication device 600 may implement corresponding processes implemented by the network device in each method in the embodiments of the present disclosure, which will not be repeated here for the sake of brevity.

Alternatively, the communication device 600 may be the mobile terminal/the terminal in the embodiments of the present disclosure, and the communication device 600 may implement corresponding processes implemented by the mobile terminal/the terminal in each method in the embodiments of the present disclosure, which will not be repeated here for the sake of brevity.

Figure 8:
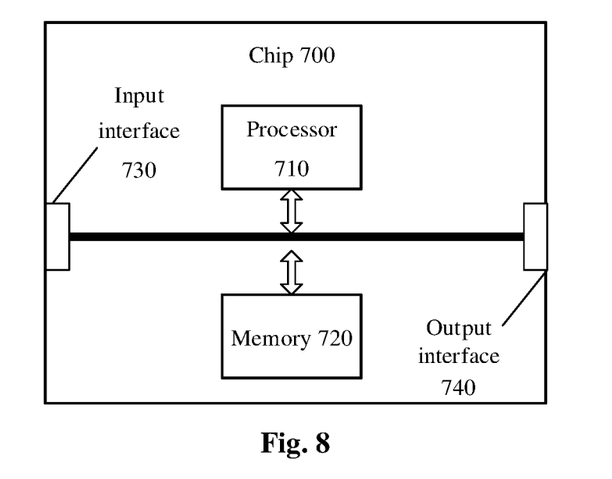
FIG. 8 is a schematic structure diagram of a chip in an embodiment of the present disclosure.

FIG. 8 is a schematic structure diagram of a chip in an embodiment of the present disclosure. The chip 700 shown in FIG. 8 includes a processor 710, and the processor 710 may call and run a computer program from a memory to implement the method in the embodiments of the present disclosure.

Alternatively, as shown in FIG. 8, the chip 700 may further include a memory 720. The processor 710 may call and run the computer program from the memory 720 to implement the method in the embodiments of the present disclosure.

The memory 720 may be a separate device independent of the processor 710, or it may be integrated in the processor 710.

Alternatively, the chip 700 may further include an input interface 730. The processor 710 may control the input interface 730 to communicate with other devices or chips, and specifically, the input interface 730 may obtain information or data sent by other devices or chips.

Alternatively, the chip 700 may also include an output interface 740. The processor 710 may control the output interface 740 to communicate with other devices or chips, and specifically, the output interface 740 may output information or data to other devices or chips.

Alternatively, the chip may be applied to the network device in the embodiments of the present disclosure, and the chip may implement corresponding processes implemented by the network device in each method in the embodiments of the present disclosure, which will not be repeated here for the sake of brevity.

Alternatively, the chip may be applied to the mobile terminal/the terminal in the embodiments of the present disclosure, and the chip may implement corresponding processes implemented by the mobile terminal/the terminal in each method in the embodiments of the present disclosure, which will not be repeated here for the sake of brevity.

It should be understood that the chip mentioned in the embodiments of the present disclosure may also be referred to as a system level chip, a system chip, a chip system or a system-on-chip, etc.

Figure 9:
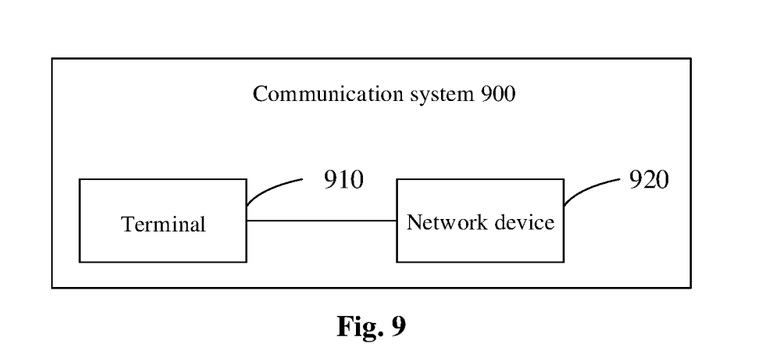
FIG. 9 is a schematic block diagram of a communication system provided by an embodiment of the present disclosure.

FIG. 9 is a schematic block diagram of a communication system 900 provided by an embodiment of the present disclosure. As shown in FIG. 9, the communication system 900 includes a terminal 910 and a network device 920.

The terminal 910 may be used to implement corresponding functions implemented by the terminal in the above methods, and the network device 920 may be used to implement corresponding functions implemented by the network device in the above methods, and will not be repeated here for the sake of brevity.

It should be understood that the processor in the embodiments of the present disclosure may be an integrated circuit chip with signal processing capability. In the process of implementation, each step of the above method embodiments may be completed by integrated logic circuits of hardware or instructions in software form in the processor. The above processor may be a general purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components. Each method, step and logic block diagram disclosed in the embodiments of the present disclosure may be implemented or executed. The general purpose processor may be a microprocessor processor, or the processor may be any conventional processor, etc. The steps combining with the methods disclosed in the embodiments of the present disclosure may be directly executed and completed by a hardware decoding processor or by the combination of hardware and software modules in a decoding processor. The software module can be located in a RAM, a flash memory, a read-only memory, a programmable read-only memory, or an electrically erasable programmable memory, a register and other mature storage medium in this field. The storage medium is located in the memory, and the processor reads information in the memory and completes the steps of the above methods combined with its hardware.

It can be understood that the memory in the embodiments of the present disclosure may be a volatile memory or a non-volatile memory, or may include both the volatile memory and the non-volatile memory. Among them, the non-volatile memory may be the Read-Only Memory (ROM), the Programmable ROM (PROM), an Erasable PROM (EPROM), and the Electrically EPROM (EEPROM) or the flash memory. The volatile memory may be the Random Access Memory (RAM), which is used as an external cache. By way of exemplary but non-limiting description, many forms of the RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories of the systems and the methods described herein are intended to include but not limited to these and any other suitable types of memories.

It should be understood that the above memories are exemplary but non-limiting description. For example, the memory in the embodiments of the present disclosure may also be the static RAM (SRAM), the dynamic RAM (DRAM), the synchronous DRAM (SDRAM), the double data rate SDRAM (DDR SDRAM), the enhanced SDRAM (ESDRAM), the synch link DRAM (SLDRAM), and the Direct Rambus RAM (DR RAM), etc. That is to say, the memories in the embodiments of the present disclosure are intended to include but not limited to these and any other suitable types of memories.

An embodiment of the present disclosure further provides a computer-readable storage medium for storing the computer program.

Alternatively, the computer-readable storage medium may be applied to the network device in the embodiments of the present disclosure, and the computer program may enable the computer to execute the corresponding processes implemented by the network device in each method in the embodiments of the present disclosure, which will not be repeated here for the sake of brevity.

Alternatively, the computer-readable storage medium may be applied to the mobile terminal/the terminal in the embodiments of the present disclosure, and the computer program may enable the computer to execute the corresponding processes implemented by the mobile terminal/the terminal in each method in the embodiments of the present disclosure, which will not be repeated here for the sake of brevity.

An embodiment of the present disclosure further provides a computer program product, including a computer program instruction.

Alternatively, the computer program product may be applied to the network device in the embodiments of the present disclosure, and the computer program instruction may enable the computer to execute the corresponding processes implemented by the network device in each method in the embodiments of the present disclosure, which will not be repeated here for the sake of brevity.

Alternatively, the computer program product may be applied to the mobile terminal/the terminal in the embodiments of the present disclosure, and the computer program instruction may enable the computer to execute the corresponding processes implemented by the mobile terminal/the terminal in each method in the embodiments of the present disclosure, which will not be repeated here for the sake of brevity.

An embodiment of the present disclosure also provides a computer program.

Alternatively, the computer program may be applied to the network device in the embodiments of the present disclosure, and the computer program, when running on a computer, may enable the computer to execute the corresponding processes implemented by the network device in each method in the embodiments of the present disclosure, which will not be repeated here for the sake of brevity.

Alternatively, the computer program may be applied to the mobile terminal/the terminal in the embodiments of the present disclosure, and the computer program, when running on a computer, may enable the computer to execute the corresponding processes implemented by the mobile terminal/the terminal in each method in the embodiments of the present disclosure, which will not be repeated here for the sake of brevity.

Those of ordinary skill in the art may realize that units and algorithm steps of each example described in combination with the embodiments disclosed herein can be implemented by electronic hardware or a combination of computer software and the electronic hardware. Whether these functions are executed by the hardware or the software depends on specific applications and design constraints of a technical solution. Professionals may use different methods to implement the described functions for each specific application, but such implementations shall not be considered beyond the scope of the present disclosure.

Those skilled in the art can clearly understand that for convenience and conciseness of the description, specific working processes of the systems, apparatuses and units described above may refer to the corresponding processes in the embodiments of the above methods, and will not be repeated here.

In several embodiments provided by the present disclosure, it should be understood that the disclosed systems, apparatuses, and methods may be implemented in other ways. For example, the apparatus embodiments described above are only schematic, for example, a division of the units is only a kind of logical function division, and there may be other division methods in actual implementation. For example, multiple units or components can be combined or integrated into another system, or some features can be ignored or not implemented. On the other hand, a mutual coupling or a direct coupling or a communication connection shown or discussed may be an indirect coupling or a communication connection through some interfaces, apparatus or units, and may be in the form of electrical, mechanical or other forms.

The units described as separate parts may or may not be physically separated, and parts displayed as units may be or may not be physical units; that is, they may be located in the same place or distributed over multiple network units. Part or all of the units can be selected according to actual needs to implement the purpose of the solution of the embodiments.

In addition, each functional unit in each embodiment of the present disclosure may be integrated in one processing unit, or each unit may physically exist independently, or two or more units may be integrated in one unit.

The functions may be stored in a computer-readable storage medium if being implemented in the form of a software functional unit and sold or used as an independent product. Based on such understanding, the essence of the technical solutions of the present disclosure, or the part contributing to the related art or a part of the technical solutions, may be embodied in the form of a software product. The computer software product is stored in a storage medium including a number of instructions such that a computer device (which may be a personal computer, a server, or a network device, etc.) performs all or a part of steps of the method described in each of the embodiments of the present disclosure. The foregoing storage medium includes any medium that is capable of storing program codes such as a USB disk, a mobile hard disk, a read-only memory, a random access memory, a magnetic disk, or an optical disk.

The foregoing descriptions are merely detailed embodiments of the present disclosure, and the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be subjected to the protection scope of the claims.

What is claimed is:

1. A method for information transmission, comprising:
sending, by a terminal, a first radio resource control (RRC) message to a first node, and receiving, by the terminal, a second RRC message sent by the first node, wherein the second RRC message carries configuration information of a second node; and
determining, by the terminal, whether the second node meets a target requirement according to a locally stored measurement result, and when the second node does not meet the target requirement, carrying, by the terminal, first indication information in a third RRC message sent to the first node, wherein the first indication information is used to indicate that the second node is not accepted by the terminal.

2. The method according to claim 1, wherein
the second RRC message further carries a first measurement threshold; and
the determining, by the terminal, whether the second node meets the target requirement according to the locally stored measurement result comprises:
determining, by the terminal, whether the second node meets the target requirement according to the locally stored measurement result and the first measurement threshold.

3. The method according to claim 2, wherein the determining, by the terminal, whether the second node meets the target requirement according to the locally stored measurement result and the first measurement threshold comprises:
determining that the second node meets the target requirement if the measurement result of the second node is greater than or equal to the first measurement threshold; and
determining that the second node does not meet the target requirement if the measurement result of the second node is less than the first measurement threshold.

4. The method according to claim 1, further comprising:
releasing, by the terminal, the configuration information of the second node when the second node does not meet the target requirement; and
correspondingly, the first indication information is further used to indicate the terminal to release the configuration information of the second node.

5. The method according to claim 1, wherein the terminal is a terminal configured with a dual-connection (DC) mode, the first node is a target master node, and the second node is an original secondary node, configuration of the original secondary node being stored on a first node side, or the second node is a new secondary node re-determined by the first node.

6. The method according to claim 1, wherein,
the first RRC message is an RRC connection resume request message, the second RRC message is an RRC connection resume response message, and the third RRC message is an RRC connection resume complete message; or,
the first RRC message is an RRC reconfiguration request message, the second RRC message is an RRC reconfiguration response message, and the third RRC message is an RRC reconfiguration complete message.

7. A method for information transmission, comprising:
receiving, by a first node, a first RRC message sent by a terminal, and sending, by the first node, a second RRC message to the terminal, wherein the second RRC message carries configuration information of a second node;
receiving, by the first node, a third RRC message sent by the terminal, and determining, by the first node, whether the third RRC message carries first indication information, wherein the first indication information is used to indicate that the second node is not accepted by the terminal; and
releasing, by the first node, the configuration information of the second node when the third RRC message carries the first indication information.

8. The method according to claim 7, wherein
the second RRC message further carries a first measurement threshold; and
the first measurement threshold is used by the terminal to determine whether the second node meets a target requirement in combination with a measurement result of the second node.

9. The method according to claim 7, wherein the first indication information is further used to indicate the terminal to release the configuration information of the second node.

10. The method according to claim 7, further comprising:
when there is a service demand on a second node side, carrying, by the first node, configuration information of a third node in a fourth RRC message sent to the terminal, or, configuring, by the first node, a bearer on the second node side as a bearer on the first node side.

11. The method according to claim 10, wherein the third node is a new secondary node re-determined by the first node, and the third node is different from the second node.

12. The method according to claim 7, wherein the terminal is a terminal configured with a DC mode, the first node is a target master node, and the second node is an original secondary node, configuration of the original secondary node being stored on the first node side, or the second node is a new secondary node re-determined by the first node.

13. The method according to claim 7, wherein
the first RRC message is an RRC connection resume request message, the second RRC message is an RRC connection resume response message, and the third RRC message is an RRC connection resume complete message; or
the first RRC message is an RRC reconfiguration request message, the second RRC message is an RRC reconfiguration response message, and the third RRC message is an RRC reconfiguration complete message.

14. A terminal, comprising:
a processor; and
a memory,
wherein the memory is configured to store a computer program, and the processor is configured to call and run the computer program stored in the memory to:
send a first RRC message to a first node;

receive a second RRC message sent by the first node, wherein the second RRC message carries configuration information of a second node;

determine whether the second node meets a target requirement according to a locally stored measurement result; and when the second node does not meet the target requirement, carry first indication information in a third RRC message sent to the first node, wherein the first indication information is used to indicate that the second node is not accepted by the terminal.

15. The terminal according to claim 14, wherein
the second RRC message further carries a first measurement threshold; and
the processor is further configured to determine whether the second node meets the target requirement according to the locally stored measurement result and the first measurement threshold.

16. The terminal according to claim 15, wherein
the processor is further configured to determine that the second node meets the target requirement if the measurement result of the second node is greater than or equal to the first measurement threshold; and
determine that the second node does not meet the target requirement if the measurement result of the second node is less than the first measurement threshold.

17. The terminal according to claim 14, wherein the processor is further configured to:
release the configuration information of the second node when the second node does not meet the target requirement; and
correspondingly, the first indication information is further used to indicate the terminal to release the configuration information of the second node.

18. The terminal according to claim 14, wherein the terminal is a terminal configured with a DC mode, the first node is a target master node, and the second node is an original secondary node, configuration of the original secondary node being stored on first node side, or the second node is a new secondary node re-determined by the first node.

19. The terminal according to claim 14, wherein
the first RRC message is an RRC connection resume request message, the second RRC message is an RRC connection resume response message, and the third RRC message is an RRC connection resume complete message; or
the first RRC message is an RRC reconfiguration request message, the second RRC message is an RRC reconfiguration response message, and the third RRC message is an RRC reconfiguration complete message.

* * * * *